(12) United States Patent
Adomeit et al.

(10) Patent No.: US 7,702,207 B2
(45) Date of Patent: Apr. 20, 2010

(54) FIBERGLASS TERMINATION

(75) Inventors: Jorg Adomeit, Berlin (DE); Antony Nijhuis, Modautal-Brandau (DE); Thea Karbstein, Berlin (DE); Joachim Brunzel, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 11/370,661

(22) Filed: Mar. 8, 2006

(65) Prior Publication Data

US 2006/0217004 A1    Sep. 28, 2006

(30) Foreign Application Priority Data

Mar. 9, 2005  (DE) .................. 10 2005 011 208

(51) Int. Cl.
*G02B 6/00* (2006.01)
(52) U.S. Cl. .................. 385/134; 385/136; 385/137
(58) Field of Classification Search ......... 385/134–137, 385/37; 359/15, 17, 18, 558, 566, 573; 369/103; 439/43, 719; 65/385
See application file for complete search history.

(56) References Cited

U.S. PATENT DOCUMENTS

| 5,724,467 | A | 3/1998 | vandenEnden et al. |
| 5,734,776 | A * | 3/1998 | Puetz ........................ 385/134 |
| 6,160,946 | A | 12/2000 | Thompson et al. |
| 6,439,779 | B1 | 8/2002 | Hafer |
| 6,631,237 | B2 * | 10/2003 | Knudsen et al. ............. 385/134 |
| RE38,311 | E * | 11/2003 | Wheeler ..................... 385/135 |
| 6,850,685 | B2 * | 2/2005 | Tinucci et al. .............. 385/134 |
| 6,918,786 | B2 * | 7/2005 | Barker et al. ............. 439/540.1 |
| 6,932,513 | B2 | 8/2005 | Kahle et al. |
| 6,981,893 | B2 * | 1/2006 | Barker et al. ............. 439/540.1 |
| 7,233,731 | B2 * | 6/2007 | Solheid et al. .............. 385/135 |
| D545,766 | S * | 7/2007 | Ma .......................... D13/147 |
| 2001/0001270 | A1 * | 5/2001 | Williams Vigliaturo ..... 385/135 |
| 2002/0176681 | A1 * | 11/2002 | Puetz et al. ................. 385/134 |
| 2003/0022552 | A1 * | 1/2003 | Barker et al. ............. 439/540.1 |
| 2003/0113086 | A1 * | 6/2003 | Jun et al. .................... 385/135 |
| 2003/0185535 | A1 * | 10/2003 | Tinucci et al. .............. 385/134 |
| 2004/0136656 | A1 | 7/2004 | Kahle et al. |
| 2005/0100301 | A1 * | 5/2005 | Solheid et al. .............. 385/135 |

FOREIGN PATENT DOCUMENTS

| DE | G 92 16 850.7 U1 | 2/1994 |
| DE | G 94 08 029.1 | 8/1994 |
| DE | 298 24 231 | 9/2000 |
| DE | 200 12 682 U1 | 11/2000 |
| DE | 200 22 507 | 3/2002 |
| GB | 2317996 | 4/1998 |
| WO | WO 02/27373 | 4/2002 |

* cited by examiner

*Primary Examiner*—Ellen Kim
(74) *Attorney, Agent, or Firm*—Merchant & Gould P.C.

(57) ABSTRACT

A fiberglass termination includes a mounting trough having a base plate and limbs. Front plates are fixed to the limbs of the mounting trough, and fiberglass couplings or adapters are arranged in the front plates.

10 Claims, 2 Drawing Sheets

FIBERGLASS TERMINATION

TECHNICAL FIELD

The invention relates to a fiberglass termination in a cable junction or a main distribution panel.

BACKGROUND

In existing copper telecommunications networks, the access network is usually in the form of a star network. With this network structure, the main cables are passed out of the switching center and are distributed between the various cable junctions of the corresponding subscriber areas. The main cable is distributed between the different cable junctions using cable couplers. Then, the main cables which have been distributed pass from the cable couplers to the cable junctions, where they are connected to terminations and are laid as branch cables in the respective streets of the subscribers. The connection to the end junction of the subscriber then usually takes place using a coupler in the branch cable. Owing to this fanning-out of the network towards the subscriber, the connection of the main cables on the subscriber or line side to the main distribution panel is the only site in the access network where all of the connections (lines) physically converge and can be tested centrally. The number of terminations in a cable junction is dependent on the physical shape of the cable junction, but a typical value is 12 terminations per cable junction.

SUMMARY

A termination comprises, for example, a mounting or accommodating trough for 10 terminal strips, which may each again connect 10 twin-cores. It is thus possible for 100 twin-cores to be connected to one termination. The accommodating trough is then preferably suspended in the cable junction frame using premounted clamping nuts, in this case the clamping nuts snapping behind the frame rails. By screwing tight suitable screws, in this case the accommodating trough is clamped tight and a connection to ground is produced.

The frame rails can in this case be dimensioned in terms of length such that a plurality of terminations can snap in (for example three), or else they can be designed for only one termination.

At the same time as the known copper telecommunications networks, fiberglass networks are increasing in importance. In this context, the fiberglass cables are distributed in the form of bundle cores from the switching center, in which case copper main cables and fiberglass bundle cores emerge from the same switching center. Distribution to the subscribers in this case takes place, however, using separate fiberglass cable junctions, which are, for example, in the form of 19" inserts. There, the incoming fiberglass cores are spliced and are passed on in the form of bundle cores to the end junctions of the subscriber. Disadvantages of this parallel structure are the relatively high costs when retrofitting fiberglass cables and the work-intensive splicing of the fiberglass cores. A similar problem arises in the transition to the switching center itself. In particular for considerations relating to fire protection, no outer cables should be passed into the switching center. Therefore, the outer cables are initially passed to a cable-distribution frame, which is generally built at a separate site in the switching center. The cable-distribution frame may in this case be in the form of a frame or else in the form of a cable-distribution coupler. There, the outer cable is spliced onto an inner cable and passed to the main distribution panel. There, in turn, pigtails are then spliced onto the inner cable and then passed to the main distribution panel.

The invention is therefore based on the technical problem of simplifying the installation of fiberglass transmission paths.

For this purpose, the fiberglass termination comprises a mounting trough, front plates being fixed to the limbs of the mounting trough, and fiberglass couplings or adapters being arranged in said front plates. This makes it possible for the fiberglass terminations to be arranged in the same cable junction housings as the copper terminations. A further advantage is the fact that, as a result, a mixed construction of copper and fiberglass terminations is also possible in one cable junction housing. When the fiberglass termination is used, in this case the splicing operation at the main distribution panel can be dispensed with. In this case, a coupling is understood to mean a receiving part for two identical plugs (for example two SC plugs), and an adapter is understood to mean a receiving part for two different plugs (such as ST and SC plugs). The couplings or adapters make it possible to jumper the glass fibers without splicing. For this purpose, said glass fibers are, for example, led up to the termination by means of an outer or inner cable having a bundle core structure and are connected to the rear side of the couplings or adapters. In this case, when used in a cable junction, an outer cable is used, whereas, in the main distribution panel, an inner cable is used. The glass fibers can then be connected to the front side by means of a further outer or inner cable (depending on the site of use) or individual cable, and passed to the subscribers or to the main distribution panel. In this case it is also possible to prefabricate the fiberglass termination with the inner or outer cable having a bundle core structure for the rear side of the fiberglass termination, it being possible for the length of the inner or outer cable to be selected by the client. In this case, the client's fitter can pass the prefabricated fiberglass termination from a coupler to the cable junction or main distribution panel and install it there.

In one preferred embodiment, the mounting trough is formed with premounted clamping nuts. This makes fixing of the fiberglass terminations to the frame rails of the cable junction housing very simple and also makes it compatible with the fixings of the copper terminations.

In a further preferred embodiment, the base plate of the mounting trough has an opening. In this case, the fiberglass cables with plugs can be passed in a simple manner through this opening to the couplings or adapters.

In a further preferred embodiment, the front plates are aligned with respect to the base plate of the mounting trough at an angle which is not equal to 180°. This makes it possible for the bending radii of the fiberglass cables emerging from the front side of the front plate to be sufficiently large and for no dirt to be able to fall into the couplings or adapters.

In a further preferred embodiment, the couplings or adapters are fixed detachably by means of a front clip from the front side of the front plate. This makes it possible for the couplings to be detached from the front side of the front plate and for the optical waveguide plugs, which have been plugged from the rear side, to be pulled out and, for example, cleaned. This very simple removal from the front side makes possible a very compact design, with the result that a correspondingly high population density is also possible per fiberglass termination. As regards the design of the front clip, express reference is made to WO 02/27373 A1.

BRIEF DESCRIPTION OF THE DRAWINGS

The invention will be described in more detail below with reference to a preferred exemplary embodiment. In the figures.

DETAILED DESCRIPTION

Figure 1:
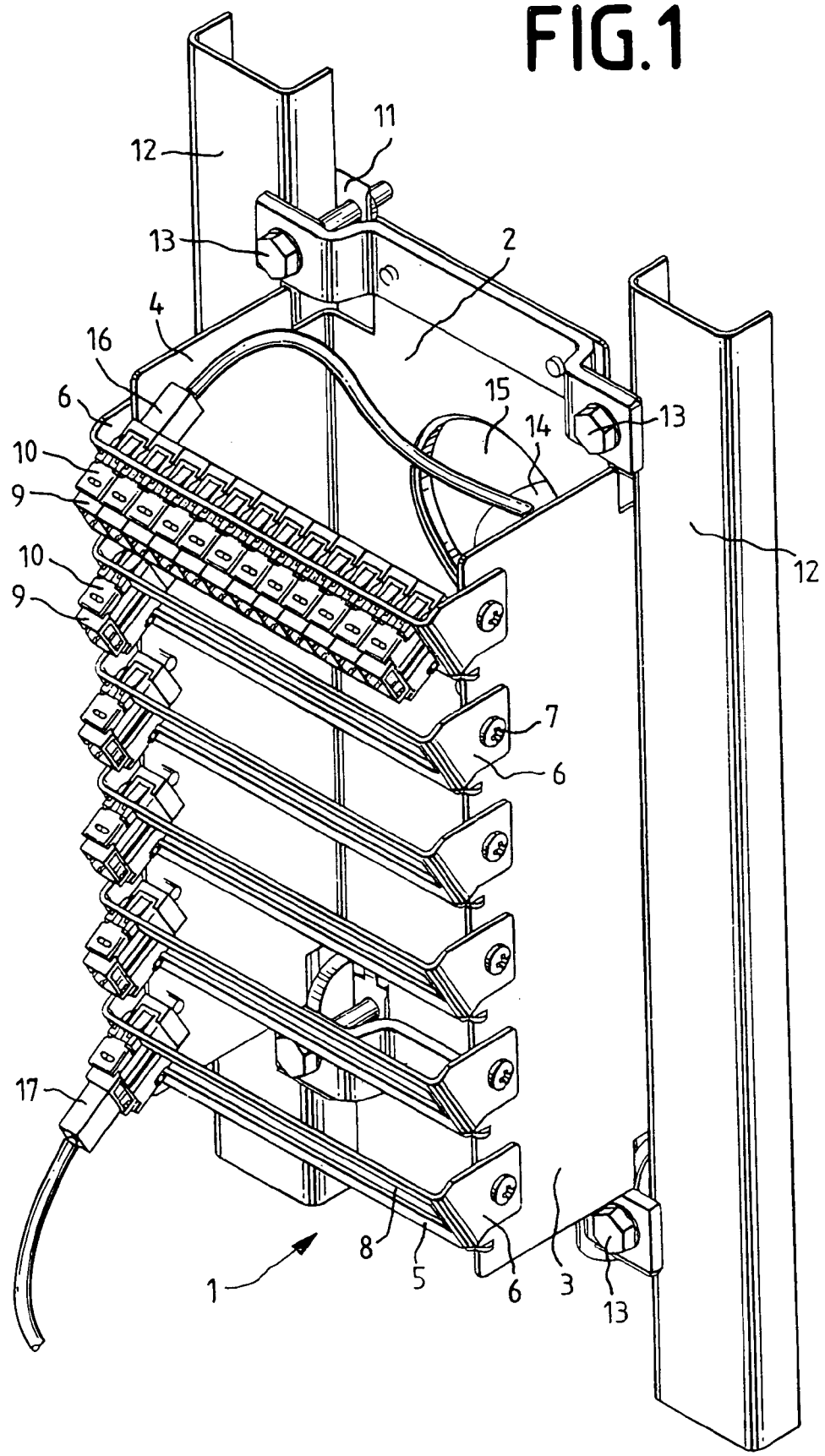
FIG. 1 shows a front view of a fiberglass termination at frame rails of a cable junction housing.
Figure 2:
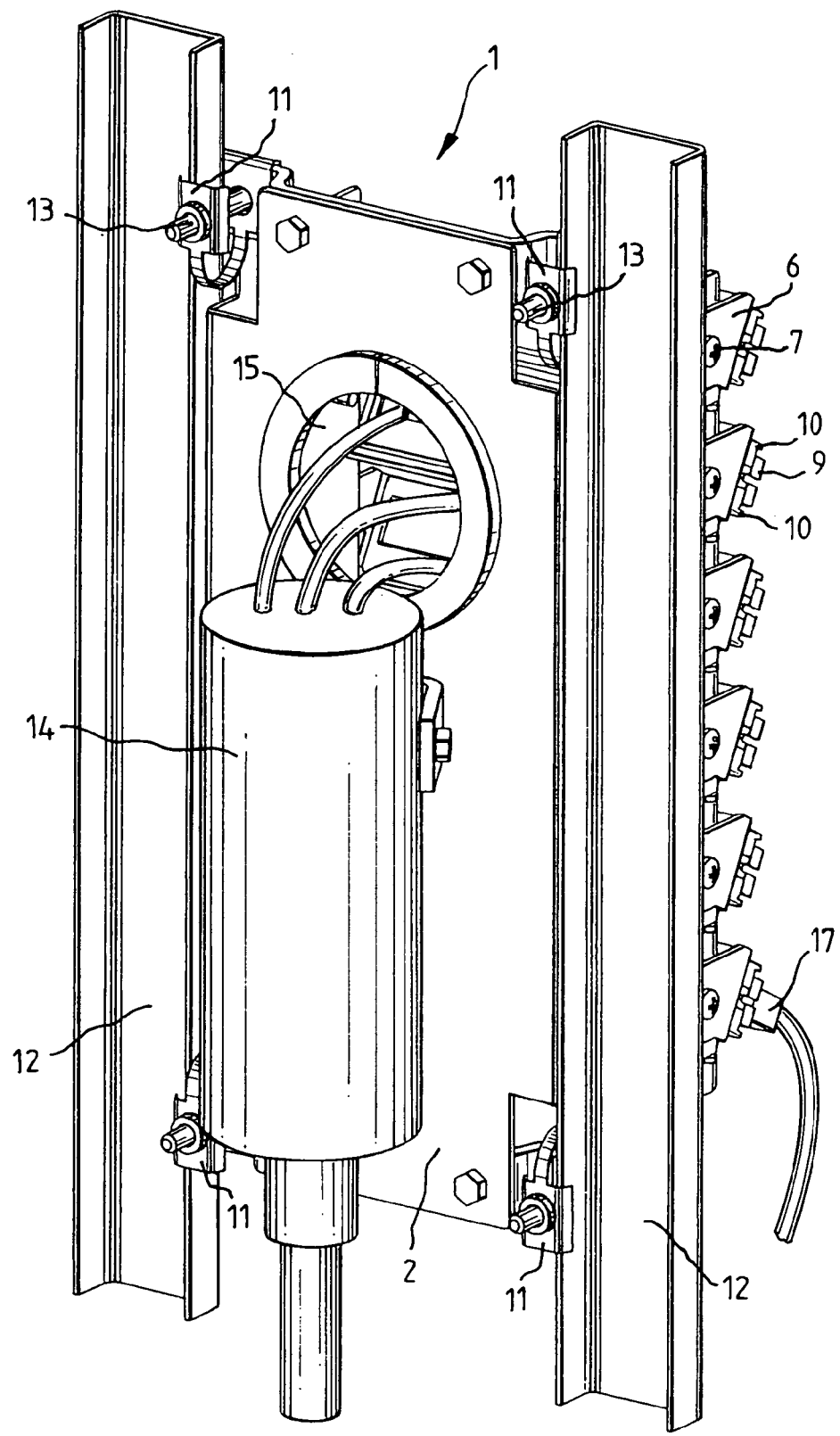
FIG. 2 shows a rear view of the fiberglass termination shown in FIG. 1.

The fiberglass termination 1 comprises a mounting trough, which is U-shaped in cross section, comprising a base plate 2 and two limbs 3, 4. Six front plates 5 having lateral bent-back sections 6 are fixed to the ends of the limbs 3, 4 which are remote from the base plate 2 by means of screws 7. The front plates 5 have a rectangular opening 8, into which twelve couplings 9 are plugged, for reasons of clarity only the uppermost front plate 5 being illustrated fully populated. The couplings 9 are formed with a two-part front clip 10, in each case one part being arranged on the upper side of the coupling 9 and one part on the underside of the coupling 9. Each part of the front clip 10 comprises two latching hooks, which engage from the rear side behind the front plate 5 and thus latch the coupling 9. Owing to pressure on the plate-like parts of the front clip 10, these latching hooks are lifted, and the coupling 9 is unlatched, with the result that said coupling can be removed from the front side of the front plate. In this case, the front side is that side of the front plate 5 which is remote from the base plate. The front plates 5 are aligned with respect to the base plate 2 of the mounting trough at an angle which is not equal to 180°, i.e. the front plate 5 and the base plate 2 are not parallel. Furthermore, the fiberglass termination 1 comprises four clamping nuts 11, by means of which the mounting trough is snapped in behind two frame rails 12. The mounting trough is then screwed tight by means of screws 13. As can be seen in FIG. 2, an outer cable 14 having a bundle core structure is arranged behind the base plate 2. An outer cable 14 having a bundle core structure is a bundle cable at one end of which the individual glass fibers are terminated with a plug. The glass fibers with the plug are pulled through an opening 15 in the base plate 2 and plugged into the rear side of the couplings 9. By way of example, a plug 16 of the outer cable 14 having a bundle core structure is illustrated in the plugged-in state in FIG. 1. Also by way of example, a plug 17 is illustrated which is plugged into the front side of the coupling, it being possible for said plug 17 to likewise be part of an outer cable having a bundle core structure or else to be associated with a single fiberglass cable. In FIG. 2, the outer cable 14 is passed parallel to the front plate. However, if a plurality of fiberglass terminations is intended to be arranged one on top of the other, the outer cables 14 having a bundle core structure are preferably passed at an angle to the rear side of the front plate 5. The fiberglass termination may also be formed with a lid. This lid on the one hand acts as protection against the ingress of dirt and, on the other hand, may be used as a label.

The fiberglass termination 1 illustrated is preferably part of a cable junction, comprising a housing in which at least two frame rails are arranged.

LIST OF REFERENCE NUMERALS

1 Fiberglass termination
2 Base plate
3 Limb
4 Limb
5 Front plate
6 Lateral bent-back sections
7 Screws
8 Rectangular opening
9 Couplings
10 Front clip
11 Clamping nuts
12 Frame rails
13 Screws
14 Outer cable
15 Opening
16 Plug
17 Plug

The invention claimed is:

1. A fiberglass termination, comprising:
a mounting trough having a base plate and first and second limbs extending from opposite ends of the base plate, the mounting trough being configured to mount to frame rails;
a plurality of vertically spaced front plates extending from first ends to second ends, the first and second ends being fixedly coupled to the respective first and second limbs of the mounting trough, the front plates being positioned on the mounting trough opposite to the base plate to define a cable chamber, each of the front plates being oriented at a downward angle with respect to the base plate of the mounting trough;
fiberglass couplings or adapters being arranged in said front plates; and
an outer cable having a bundle core structure arranged behind the base plate, the outer cable including individual fibers at one end, each of the individual fibers being terminated with a plug, the individual fibers being routed through an opening in the base plate and plugged into rear sides of the fiberglass couplings or adapters.

2. The fiberglass termination as claimed in claim 1, wherein the mounting trough is formed with premounted clamping nuts.

3. The fiberglass termination as claimed in claim 1, wherein the couplings or adapters are fixed detachably by a front clip from a front side of the front plate.

4. A fiberglass termination, comprising:
a mounting trough including a base plate and generally parallel first and second limbs extending from the base plate on opposite ends of the base plate, the base plate defining an opening through which individual glass fibers can pass, the mounting trough being configured to extend between and to mount to frame rails;
premounted clamping nuts coupled to the mounting trough for clamping the mounting trough behind the frame rails;
a plurality of front plates, each front plate having a first end and a second end, the first ends of the front plates being coupled to the first limb of the mounting trough and the second ends of the front plates being coupled to the second limb of the mounting trough, each of the front plates being oriented at a downward angle with respect to the base plate of the mounting trough;

fiberglass couplings or adapters being detachably coupled to the front plates; and an outer cable having a bundle core structure arranged behind the base plate, the outer cable including individual fibers at one end, each of the individual fibers being terminated with a plug, the individual fibers being routed through the opening in the base plate and plugged into rear sides of the fiberglass couplings or adapters.

5. The fiberglass termination as claimed in claim 4, wherein front clips couple each of the fiberglass couplings or adapters to the front plates.

6. The fiberglass termination as claimed in claim 4, wherein twelve couplings are detachably coupled to the front plates.

7. A fiberglass termination, comprising:

a mounting trough including a base plate and generally parallel limbs extending forwardly from the base plate to provide a generally U-shaped cross-section;

a plurality of front plates, each front plate having a first planar section extending between a first end and a second end, the first planar section defining an opening, the first and second ends forming second sections bent back from the first planar section, wherein the second sections of the front plates fasten to the limbs of the mounting trough using screws to position the front plates opposite to the base plate to define a cable chamber in front of the base plate, the first planar section of each of the front plates being oriented at a downward angle with respect to the base plate of the mounting trough;

fiberglass couplings or adapters being detachably coupled within the opening of the first planar section of at least one front plate; and an outer cable having a bundle core structure arranged behind the base plate, the outer cable including individual fibers at one end, each of the individual fibers being terminated with a plug, the individual fibers being routed through an opening in an upper section of the base plate and plugged into rear sides of the fiberglass couplings or adapters.

8. The fiberglass termination as claimed in claim 7, wherein twelve couplings are detachably coupled within the opening of the first section of the at least one front plate.

9. The fiberglass termination as claimed in claim 4, wherein each front plate is planar between the first and second ends.

10. The fiberglass termination as claimed in claim 1, wherein each front plate is planar between the first and second ends.

* * * * *